United States Patent Office 3,486,307
Patented Dec. 30, 1969

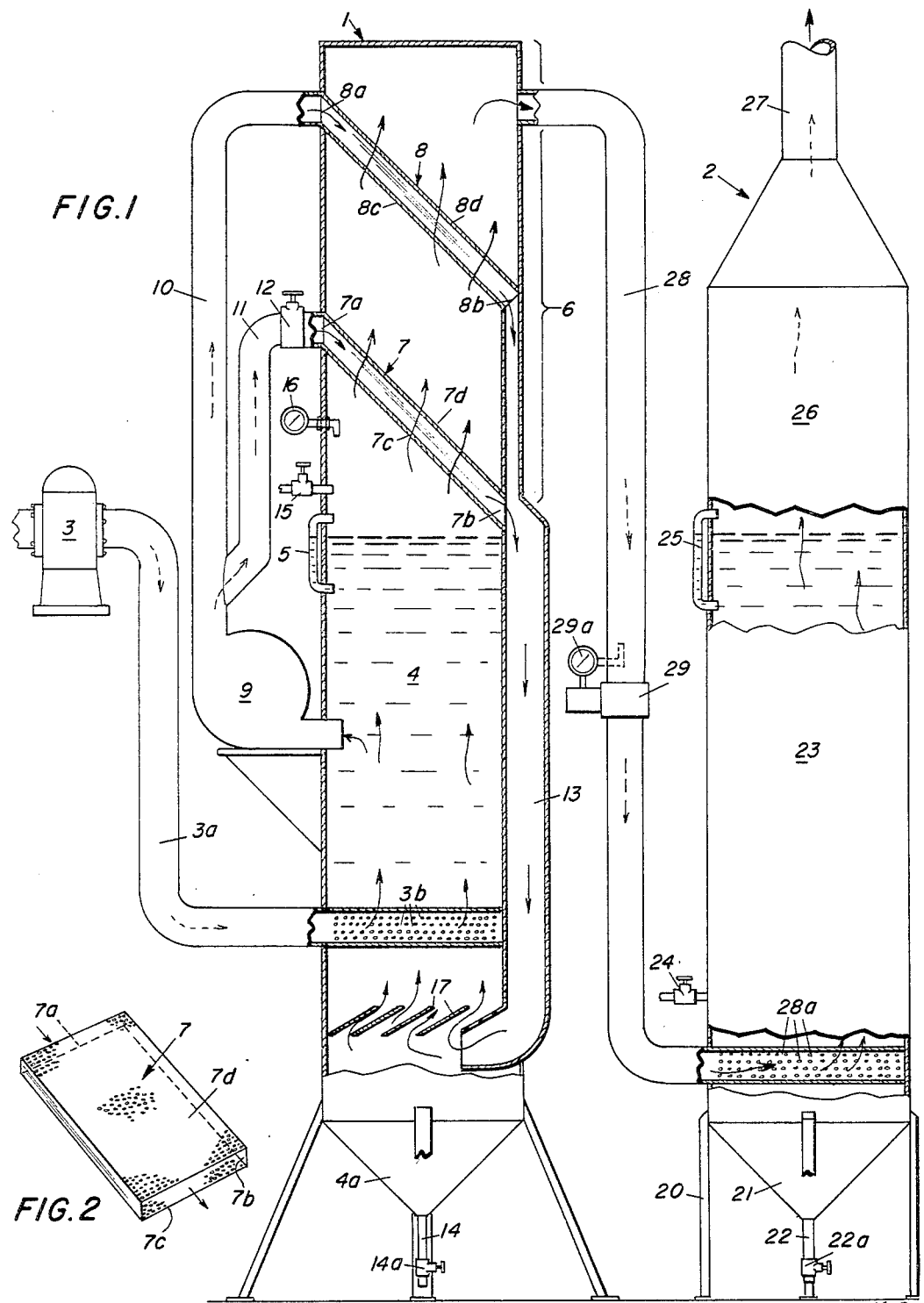

3,486,307
AIR POLLUTION ELIMINATION APPARATUS
Lyle C. McDermott, deceased, late of Boise, Idaho, by Mabel F. McDermott, administratrix, 1200 Leadville Ave., Boise, Idaho
Filed Jan. 10, 1968, Ser. No. 697,567
Int. Cl. B01d 47/02
U.S. Cl. 55—226      4 Claims

ABSTRACT OF THE DISCLOSURE

Gas washing apparatus comprising washing towers connected in series and including submerged gas discharge means and overlying flat-like perforated tubular members.

---

In the separation of pollutant particles from smoke and gases such as carbon particles and the like, saturation of the particles is necessary as one means of separation. By compressing the gases, their volume is reduced and they are more efficiently handled.

It is an object of the invention to handle the compressed gases so that the pollutants are removed.

Another object is to pass the compressed gases through liquid in reservoirs and to pass the wetted gases through perforated plates having cross flow of liquid therepast to strip off bubbles of compressed gases passing through perforated plates and trap the saturated pollutant particles in the cross flow liquid stream.

In the apparatus according to my invention as described in the abstract of disclosure, there are two vertically spaced apart sloping flat-like tubular perforated members. These two flat-like tubular perforated members have relatively small perforations extending transversely through their top and bottom walls. These highly polished perforated stainless steel plates insure a smooth and rapid flow of the liquid circulated therethrough. As the compressed smoke and pollutant gases accumulate in the space above the liquid level in the liquid reservoir and below the first perforated tubular member and between the two tubular members, they are forced into the cross flow of liquid passing between the top and bottom walls of each perforated tubular member. The upper tubular member prevents the flow of circulated liquid from being through at random up and into the space below and above the upper tubular member. The upper tubular member maintains a uniform flow of water therethrough between its upper and lower perforated plates. The lower tubular member with its perforated bottom and top walls interrupts the smoke and gases as they are forced into and through the relatively very tiny gas and smoke bubbles which pass upward and out of the liquid flow. This results in a much faster and thorough saturation of carbon particles and other harmful pollutants and substances. The gas or smoke pressure contained inside of the bubble protects the carbon and other impurities from becoming sufficiently saturated with liquid and therefore the smaller the bubbles, the faster the carbon particles and other impurities become saturated or liquid logged which is necessary before they will settle to the bottom of any reservoir. In addition thereto, when high pressure is also applied, the speed of saturation while these particles are submerged in the liquid is multplied many times.

For a more complete understanding of the whole nature of the invention, reference is had to the detailed description and the claims which follow. In the drawings referred to in the description;

FIG. 1 is a schematic of the whole apparatus showing two towers, and

FIG. 2 is a perspective view of one of the flat-like tubular perforated members used in the countercurrent chamber of the first tower.

Throughout the description, like reference numbers refer to similar parts.

A first tower 1 receives compressed smoke and gases from a compressor 3 throughout a conduit 3a, separates a part of the pollutants and the gas as cleared therein is transferred to a second tower 2 where the residual pollutants are separated out and the clear gas is discharged out the top of the tower 3.

Tower 1 has in its bottom portion a liquid reservoir 4 into which compressed gases are received through conduit 3a submerged therein and perforated at its discharge end. A sight glass 5 indicates the liquid level in the reservoir 4. Above the liquid reservoir 4 is a countercurrent treating chamber generally indicated at 6. In this chamber 6 in the tower is a lower flat-like tubular perforated member 7 and spaced vertically above it in the countercurrent treating chamber 6 is a like tubular perforated member 8.

Each of the flat-like tubular perforated members are installed so as to slope downwardly and generally parallel to each other across the countercurrent treating chamber 6. Each of these tubular members 7 and 8 has an intake end 7a, 8a, respectively, and a discharge end 7b, 8b, respectively, extending in the tower to which supply and discharge conduits are attached.

A liquid circulating pump 9 has a suction 9a extending into the liquid reservoir 4. A discharge conduit 10 leads from the pump 9 to the inlet 8a of the top tubular perforated member 8. A branch conduit 11 having a cutoff valve 12 therein leads from conduit 10 to the inlet end 7a of the tubular perforated member 7.

A common discharge conduit 13 connects with the discharge ends 7b and 8b of the tubular perforated members. This discharge conduit 13 leads to the bottom of the reservoir 4 in tower 1. At the bottom of the reservoir 4 is a sump 4a and at its bottom is a drain conduit 14 having a drain valve 14a therein.

In the countercurrent treating chamber 6 within the tower 1 is a fill line and valve 15 for filling the liquid reservoir portion 4 of the tower. Above this fill line and valve 15 and below the lower tubular perforated member 7 is a pressure gauge 16.

To break up turbulence in the bottom of the reservoir 4 on the return of the circulating liquid in conduit 13 there are spaced apart and inclined baffles 17 positioned just above the discharge of the return circulating conduit 13.

In FIG. 2 the perforated tubular member 7 is shown. It is flat-like and has a bottom perforated wall 7c and a spaced thereabove top perforated wall 7d.

At the right of tower 1 is the second tower 2 suitably supported on legs 20 like the first tower is supported. Tower 2 has a sump 21 in its bottom and a drain line 22 with a cut off valve 22a therein. The lower portion of tower 2 has a liquid reservoir 23. A fill line and valve 24 discharges into the liquid reservoir 23 near its bottom. A sight glass 25 serves to indicate the liquid level in the reservoir portion 23. Above the liquid reservoir 23 is a cleared gas discharge chamber 26 that communicates with an exhaust stack portion 27.

The partially cleared gas from tower 1 is conducted from the top portion of the countercurrent treating chamber 6 of tower 1 by a transfer conduit 28 which conducts the partially cleared gas under pressure to the bottom portion of liquid reservoir portion 23 in tower 2. The conduit 28 has a perforated discharge end 28a that is submerged in the lower portion of reservoir 23 spaced above the sump 21.

In the gas transfer conduit 28 is installed a pressure regulator or controller generally indicated at 29 having a pressure indicator gauge 29a in the controller.

The gases have been partially cleared of pollutants in tower 1 particularly in the countercurrent treating chamber portion 6. These treated gases still under pressure are released under controlled pressure conditions through the discharge 28a submerged in the bottom of reservoir 23. The gases percolate up through the liquid bath in reservoir 23 and residual particles are removed and settle to the bottom of reservoir 23 into the sump portion 21. The collected particles are drained off through the drain 22.

What is claimed is:

1. An apparatus for separating pollutants carried by a gas such as air, smoke and the like comprising a compressor for compressing the polluted gas;
   a first tower having a liquid reservoir having a conduit connecting the lower part thereof and below the water level with said compressor for discharge of the compressed polluted gas for percolation up through the liquid in said reservoir,
   a countercurrent treating chamber having a relatively large cross-sectional area above and in communication with said liquid reservoir,
   at least one perforated distributor means slopingly extending across said countercurrent treating chamber and having an entrance for liquid at its upper end in the wall of the chamber and a discharge at its lower end in the wall of the chamber for discharge of liquid flowing over the perforated distributor means,
   pump and conduit means connected to said liquid reservoir and to the entrance for liquid onto said perforated distributor means,
   said perforated distributor means having relatively small openings through which the gas carrying the pollutants passes as small bubbles incapsulating pollutants such as carbon from smoke, said liquid flowing over said perforated distributor means stripping and entraining the wetted pollutants from said gas and bubbles as they pass upward through said relatively small openings,
   said perforated distributor means comprises a flat-like in shape tubular member having a lower wall and an upper wall spaced relatively close thereabove, each of said walls having said relatively small openings extending upwardly therethrough, said wetted pollutant particles collecting on the surface of said perforated walls and being stripped therefrom by and entrained in said liquid that flows generally transversely to the movement of the gases therethrough,
   conduit means connecting the discharge lower end of said perforated distributor means with the lower portion of said liquid reservoir adjacent its bottom,
   said liquid reservoir having a pollutant collecting sump at its bottom and a valved conduit discharge to drain separated pollutants collected in said sump,
   a second tower having a liquid reservoir having a conduit with a pressure regulator means therein connecting the lower part of the tower with the upper portion of said counter-current treating chamber above said perforated distributor means therein for conducting gas stripped of some pollutants,
   an exhaust chamber above the liquid reservoir of the second tower for conducting off the gas that percolates up through the liquid in the second tower and that has been stripped of residual pollutants,
   said second tower liquid reservoir having a sump and drain means in its bottom.

2. An apparatus according to claim 1 wherein the conduit from the compressor where it discharges into said first tower liquid reservoir extends transversely thereacross and has relatively small perforations therein to distribute the compressed gas carrying the pollutants and wherein said conduit discharging gas into said liquid reservoir of the second tower extends likewise into its reservoir and is likewise perforated, said first tower having in the bottom of the liquid reservoir and adjacent the discharge end of the conduit leading from the discharge end of said perforated distributor means in the countercurrent treating chamber a plurality of spaced apart baffles to break up turbulence and direct upwardly the liquid being circulated.

3. An apparatus according to claim 2 including in the countercurrent treating chamber in the first tower a second perforated distributor means similarly positioned and spaced above the first distributor means and having a supply conduit connecting with the pump and conduit means and a discharge conduit connecting with the discharge conduit of the first perforated distributor means.

4. A tower for separating pollutants carried by a gas such as air, smoke and the like comprising
   a liquid reservoir having a conduit connected to the lower part thereof and below the water level for introduction of polluted gas for percolation up through the liquid in the reservoir,
   a countercurrent treating chamber having a relatively large cross-sectional area above and in communication with said liquid reservoir,
   a pair of vertically spaced apart distributor means slopingly extending across said countercurrent treating chamber and having an entrance for liquid at the upper ends in the wall of the chamber and discharge for liquid at their lower ends in the wall of the chamber for discharging liquid flowing thereover,
   pump and conduit means connected to said liquid reservoir and to the entrance for liquid of said perforated distributor means,
   said perforated distributor means having relatively small openings through which the gas carrying the pollutants passes as small bubbles incapsulating pollutants such as carbon from smoke, said liquid flowing over said perforated distributor means stripping and entraining the wetted pollutants from said gas and bubbles as they pass upward through said relatively small openings,
   conduit means connecting the lower ends of said perforated distributor means with the lower portion of said liquid reservoir adjacent its bottom,
   said liquid reservoir having a pollutant collecting sump at its bottom and a valved conduit discharge to drain separated pollutants collected in said sump,
   each distributor means comprising a flat-like in shape tubular member having a lower wall and an upper wall spaced relatively close thereabove, each of said walls having said relatively small openings extending upwardly therethrough, said wetted pollutant particles collecting on the surface of said perforated walls and being stripped therefrom by and entrained in said liquid that flows generally transversely to the movement of the gases therethrough.

References Cited

UNITED STATES PATENTS

| | | | |
|---|---|---|---|
| 652,773 | 7/1900 | Hirt | 55—255 X |
| 999,114 | 7/1911 | Lang | 261—106 X |
| 1,388,812 | 8/1921 | Geesman | 261—113 X |
| 1,725,925 | 8/1929 | Kent | 261—122 |
| 1,866,443 | 7/1932 | Zumbro | 55—255 X |
| 2,234,385 | 3/1941 | Ryner | 261—113 |
| 2,947,112 | 8/1960 | Morrison | 261—110 |
| 3,113,168 | 12/1963 | Kinney | 261—65 X |
| 3,266,224 | 8/1966 | Ferretti | 55—241 |
| 3,349,839 | 10/1967 | Priestley | 261—106 X |

TIM R. MILES, Primary Examiner

U.S. Cl. X.R.

55—240, 256; 261—17, 22, 65, 109, 113, 122